United States Patent [19]

Robbins, III

[11] Patent Number: 5,060,816
[45] Date of Patent: Oct. 29, 1991

[54] COMPOSITE CONTAINER AND ASSOCIATED CARRIER

[76] Inventor: Edward S. Robbins, III, 459 N. Court, Florence, Ala. 35630

[21] Appl. No.: 432,672

[22] Filed: Nov. 7, 1989

Related U.S. Application Data

[63] Continuation-in-part of Ser. No. 288,237, Dec. 22, 1988, and Ser. No. 332,994, Apr. 4, 1989, abandoned, and Ser. No. 379,783, Jul. 14, 1989, abandoned.

[51] Int. Cl.$^5$ .................................................. A47J 47/00
[52] U.S. Cl. .................................. 220/404; 215/1 C
[58] Field of Search ............... 220/404, 400, 401, 402, 220/403, 410, 85 H; 215/1 C

[56] References Cited

U.S. PATENT DOCUMENTS

| | | | |
|---|---|---|---|
| 2,321,836 | 6/1943 | Marzo | 225/11 |
| 2,352,503 | 6/1944 | Walton | 229/14 |
| 2,876,113 | 3/1959 | Barton | 426/117 |
| 2,952,379 | 9/1960 | Potter | 220/6 |
| 3,039,648 | 6/1962 | Busch | 220/63 |
| 3,055,568 | 9/1962 | Zalkind | 229/14 |
| 3,101,839 | 8/1963 | Holman | 206/2 |
| 3,163,544 | 12/1964 | Valyi | 99/171 |
| 3,179,323 | 4/1965 | Miller | 229/14 |
| 3,187,966 | 6/1965 | Klygis | 222/541 |
| 3,255,932 | 6/1966 | Hunter | 222/183 |
| 3,285,461 | 11/1966 | Santelli | 220/404 |
| 3,321,070 | 5/1967 | Childs | 206/46 |
| 3,450,254 | 6/1969 | Miles | 220/404 X |
| 3,484,011 | 12/1969 | Greenhalgh et al. | 220/404 X |
| 3,529,647 | 9/1970 | Ignell | 150/0.5 |
| 3,545,643 | 12/1970 | Higgins | 220/63 |
| 3,567,104 | 3/1971 | Arslanian | 229/14 |
| 3,604,491 | 9/1971 | Spless | 150/8 |
| 3,606,962 | 9/1971 | Scholle | 222/105 |
| 3,643,854 | 2/1972 | Holmes | 229/14 |
| 3,648,882 | 3/1972 | Shelton | 220/63 |
| 3,656,280 | 2/1971 | Rausing | 220/63 |
| 3,679,125 | 7/1972 | Forance et al. | 220/85 H X |
| 3,739,827 | 6/1973 | Sondel | 150/0.5 |
| 3,765,574 | 10/1973 | Urquiza | 222/183 |
| 3,776,408 | 12/1973 | Wald | 220/404 X |
| 3,784,039 | 1/1974 | Marco | 215/11 |
| 3,861,577 | 1/1975 | Druyts | 229/7 |
| 3,900,120 | 8/1975 | Sincock | 215/1 C |
| 3,918,605 | 11/1975 | Butler | 220/63 |
| 3,982,029 | 9/1976 | Rausing | 426/106 |
| 4,012,472 | 3/1977 | Lindsey | 261/124 |
| 4,027,427 | 6/1977 | Stoller | 47/1.1 |
| 4,151,929 | 5/1979 | Sapien | 220/404 |
| 4,171,751 | 10/1979 | Schutz | 220/468 |
| 4,172,152 | 10/1979 | Carlisle | 426/127 |
| 4,174,051 | 11/1979 | Edwards | 222/105 |
| 4,286,723 | 9/1981 | Schutz | 220/5 |
| 4,330,066 | 5/1982 | Berliner | 220/404 |
| 4,397,643 | 8/1983 | Rygiel | 604/317 |
| 4,449,984 | 5/1984 | Cruz | 604/319 |
| 4,457,455 | 7/1984 | Meshberg | 222/103 |
| 4,459,793 | 7/1984 | Zenger | 53/434 |
| 4,471,882 | 9/1984 | Joo | 220/450 |
| 4,492,313 | 1/1985 | Touzani | 215/1 C |
| 4,635,814 | 1/1987 | Jones | 220/403 |
| 4,653,671 | 3/1987 | Duffy | 222/105 |
| 4,671,427 | 6/1987 | Farquharson | 222/83.5 |
| 4,795,062 | 1/1989 | Bedwell | 222/92 |
| 4,805,799 | 3/1988 | Robbins | 220/404 X |
| 4,815,615 | 3/1989 | Phlaphongphanich | 215/11.6 |
| 4,818,545 | 4/1989 | Kunimoto | 426/107 |
| 4,919,299 | 4/1990 | Haines | 220/404 |
| 4,930,644 | 6/1990 | Robbins | 220/403 X |

FOREIGN PATENT DOCUMENTS

| | | |
|---|---|---|
| 489720 | 9/1975 | Australia . |
| 0182094 | 6/1985 | European Pat. Off. . |
| 1287487 | 2/1962 | France . |
| 1129609 | 10/1968 | United Kingdom . |
| 2109247 | 6/1983 | United Kingdom . |

Primary Examiner—Steven M. Pollard
Attorney, Agent, or Firm—Nixon & Vanderhye

[57] ABSTRACT

A packaging system for liquids includes a relatively rigid open top carrier provided with a carrying/pouring handle, the carrier adapted to receive a collapsible container in nested relationship. The unitary, collapsible, but normally self-supporting container includes an integral dispensing portion including a pour spout and a screw-on type cap. The container and carrier are provided with cooperable surface configurations which releasably hold the container within the carrier during pouring.

19 Claims, 2 Drawing Sheets

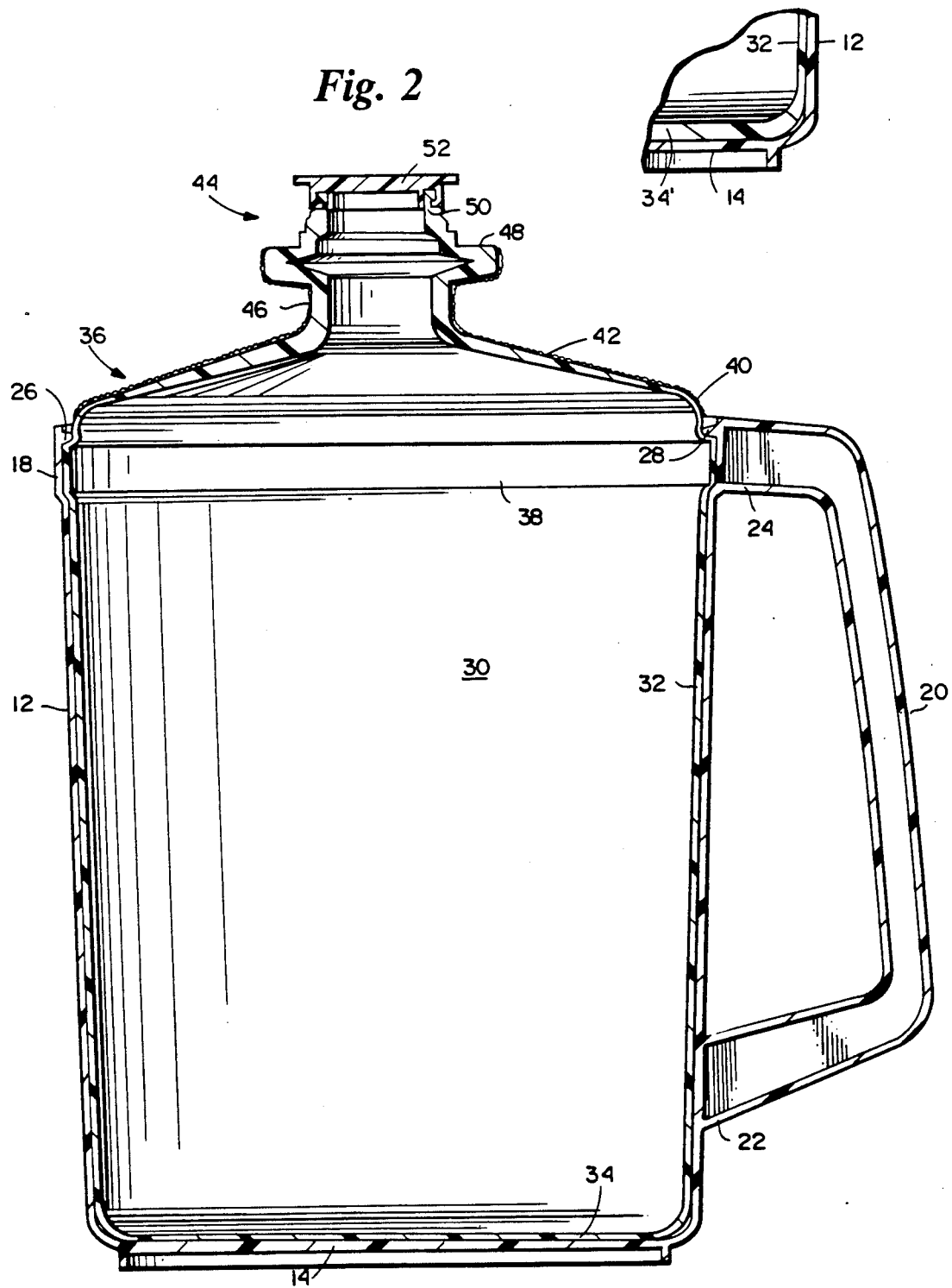

COMPOSITE CONTAINER AND ASSOCIATED CARRIER

CROSS-REFERENCE TO RELATED APPLICATIONS

This application is a continuation-in-part of commonly owned and copending U.S. patent application Ser. No. 07/288,237 filed on Dec. 22, 1988, and entitled "Thin Film Container with Removable Lid and Related Process"; Ser. No. 07/332,994 filed on Apr. 4, 1989 and entitled "Containers Having Upper and Lower Sections of Different Thicknesses and Extrusion Blow-Molding Methods to Form the Same", now abandoned; and Ser. No. 07/379,783 filed July 14, 1989 and entitled "Containers with Thin Film Integral Lining" now abandoned. This application is also related to commonly owned, and copending U.S. patent application Ser. No. 07/372,760 filed on June 29, 1989, and entitled "Sleeved Containers with Thin Film Lining"; Ser. No. 07/372,761 filed on June 29, 1989, entitled "Containers Having One or More Integral Annular Bands of Increased Thickness" and Ser. No. 07/431,760, filed on Nov. 6, 1989 and entitled "Composite Container Assemblies", the entire content of each of these prior-filed U.S. applications being expressly incorporated herein by reference.

FIELD OF THE INVENTION

This invention generally relates to containers for holding various materials, particularly liquid foodstuffs, for example milk, water, juice, dish and laundry detergent and the like. More specifically, the present invention relates to a collapsible, disposable container and a relatively rigid reusable container carrier which is adapted to receive the collapsible container in a nested relationship, and which enables the consumer to use and then dispose of the empty container. Identical refill containers may be purchased for use alone or with the relatively permanent and reusable carrier.

BACKGROUND AND SUMMARY OF THE INVENTION

In my earlier issued U.S. Pat. No. 4,805,799, novel containers are disclosed which include a substantially rigid upper container segment, a flexible bladder integral with, and depending from, the upper container segment, and a lower substantially rigid container segment attached to the upper container segment so that the flexible bladder is housed therewithin. While the containers disclosed in that patent are usable in many end-use applications, certain specialized end-use applications demand equally specialized containers.

The containers of the present invention represent improvements over the container disclosed in my earlier filed parent and related applications, and are particularly well suited for use in additional special end-use applications as described further herein.

There is great concern in government and in the food packaging industry for potential environmental hazards associated with disposable plastic containers used in the packaging and sale of beverages such as milk, water, juice, etc. and other liquids or semi-liquids (viscous liquids) such as detergents, ketchup, etc. It has been estimated that in the dairy industry alone, as much as 500 million pounds of plastic are required each year for consumer oriented container applications, virtually all of which eventually finding its way to landfills and/or other waste sites. Significant amounts of waste plastic are also produced by the manufacture of such large amounts of plastic, thereby also contributing to the waste problem. The container assemblies of the present invention alleviate this problem to the extent of reducing the plastic required to form, for example a one-gallon container, by about fifty percent.

Moreover, and quite surprisingly, applicant has discovered that even with only approximately half the plastic content, containers made in accordance with this invention nevertheless pass the standard beverage container "drop test", by utilizing a low density polymer plastic, preferably polyethylene, in the container construction as disclosed herein.

As a result of this discovery, raw material costs for producing one gallon plastic containers are also reduced by about fifty percent. Given the sheer volume of such containers currently produced in the U.S., it is readily apparent that substantial savings, estimated at about 50% per unit for raw material costs, can be realized by constructing containers in accordance with this invention. Similar relative savings can be expected in smaller and larger containers. In addition to reduced cost, the amount of plastic disposed of by the consumer will also be reduced by about 50%, and the reduced raw material requirements will also result in reduced waste disposal at the plastics manufacturing plant.

In one exemplary embodiment of the invention, a collapsible container and carrier assembly is provided which includes an open-top, relatively rigid carrier and a relatively thin, flexible and collapsible container having an integral dispensing portion adapted to receive a conventional closure, e.g., a screw on cap. The container, which is preferably normally self-supporting (filled or empty), may be nested within the carrier.

In accordance with a preferred use of the invention, packagers in the dairy industry would fill one gallon plastic containers in accordance with this invention, ship the containers to retailers, divided proportionately (as determined by market demand) between containers nested in carriers, and stand alone containers. Additional carriers would also be supplied for separate sale, again as determined by consumer demand. Consumers would then purchase one or more of the relatively rigid reusable carriers and filled containers, and will thereafter purchase "refill" or "insert" plastic containers for nesting within the carriers or for use alone, as will be described further herein. The containers themselves would be collapsed and disposed of upon depletion of the liquid contents, and the collapsibility feature will result in significantly reduced volumes of waste.

It will be appreciated that the relatively rigid carriers provide protection, strength and rigidity to the overall assembly, which is particularly advantageous when the inner container is less than full, and thus more easily collapsed merely by handling. Specifically, the carrier and container shape are preferably complimentary so that good support is afforded to substantial portions of the container side and bottom walls.

It is a further advantageous feature of the invention that the container is releasably held within the carrier, so that pouring of the liquid contents is easily accomplished via use of a handle provided on the carrier, without danger of the container sliding out of the carrier.

It should be appreciated that while using the container with an associated carrier has certain benefits and advantages as described herein, the container may be used alone if desired. In other words, in the preferred embodiment, the container is normally self-supporting, but collapsible. This means that the container will stand alone both filled and empty, and the liquid contents may be poured from the container in a controlled fashion, particularly if the bottom of the container is held with the other hand to prevent the body of the container from collapsing during pouring.

Thus, in accordance with one aspect of the present invention, there is provided a collapsible container and carrier assembly comprising a relatively rigid carrier having a first peripheral side wall and a first bottom wall defining a first shape; a relatively thin, flexible and stand-along but collapsible container body having a second peripheral sidewall and a second bottom wall defining a second shape substantially complementary to the first shape; the container body also provided with a top wall having an integral or unitary, relatively rigid dispensing portion formed therein, wherein the container body is nestable within the carrier so that substantially all of the peripheral side wall and carrier bottom wall are in engagement with and provide support for the container peripheral side wall and container bottom wall.

In accordance with another aspect of the invention, a one-piece self-supporting, collapsible plastic container comprises a relatively thin peripheral side wall, a bottom wall and a top wall, the top wall having a unitary and relative rigid dispensing portion including closure receiving means formed thereon, the peripheral side wall having a thickness of between about 2 and about 12 mil, and the dispensing portion having a thickness of at least about 15 mil.

In accordance with another aspect of the invention, a method of packaging and distributing liquids is provided which comprises the steps of:

a) providing a relatively rigid and reusable carrier having a first peripheral side wall including a handle, a first bottom wall, and an open upper end;

b) providing a flexible and collapsible container having a second peripheral side wall, a second bottom wall and a top wall formed with an upstanding dispensing portion therein;

c) filling the container with a liquid and applying a removable closure to the dispensing portion;

d) nesting the container within the carrier such that substantially all of the carrier peripheral side wall and carrier bottom wall are in engagement with, and provide support for, the container peripheral side wall and container bottom wall;

e) discharging the liquid from the container by removing the closure and tilting the carrier via the handle to thereby pour the liquid from the dispensing portion; and f) when the container is empty, removing the empty container from the carrier.

Thus, in accordance with the present invention, the cost of such beverage and other liquid containers can be significantly reduced, while at the same time alleviating environmental concerns by reason of a significant reduction in the amount of plastic required to manufacture such containers, and a concurrent reduction in amount and volume of plastic container waste at the consumer and manufacturing levels.

Additional objects and advantages of the variously described exemplary embodiments of the invention will become apparent after careful consideration of the detailed description which follows.

BRIEF DESCRIPTION OF THE DRAWINGS

FIG. 2 is a side cross sectional view of the container and carrier shown in FIG. 1, but in nested relationship.

FIG. 3 is an enlarged view of the peripheral side wall-bottom wall junction area of FIG. 2.

DETAILED DESCRIPTION OF THE DRAWINGS

Figure 1:
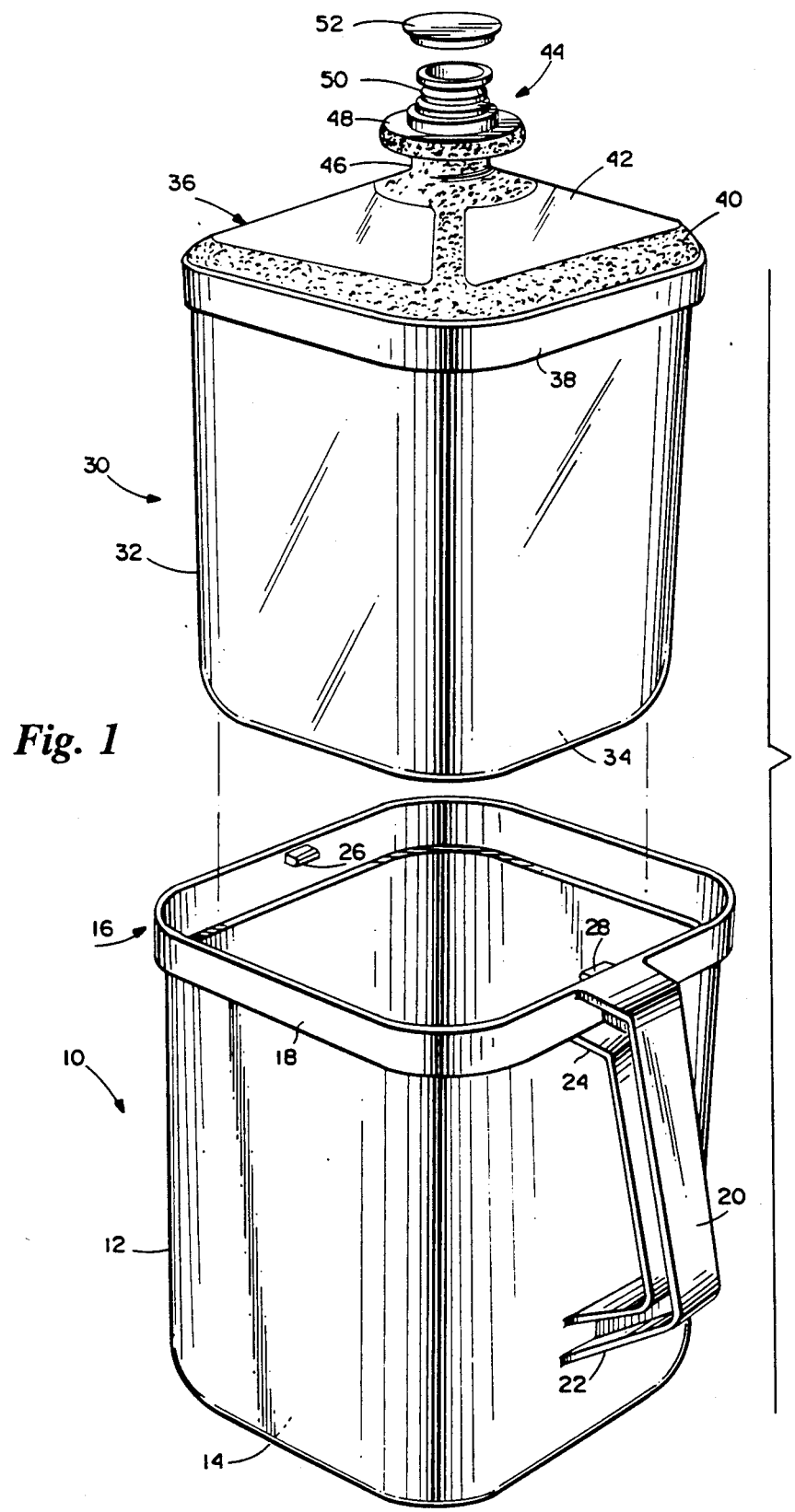
FIG. 1 is a perspective, exploded view of a container and associated carrier in accordance with the present invention.

Referring to FIGS. 1 and 2, a carrier 10 is provided in the form of a pitcher, and is preferably, but not necessarily, constructed of relatively rigid plastic material. The carrier is formed with a peripheral side wall 12, a bottom wall 14, and an upper open end 16. The upper open end may be provided with an integrally formed peripheral reinforcing ring or rib 18.

The peripheral side wall 12 has a substantially square configuration, with four substantially identical sides, but it will be understood that other shapes such as round, rectangular, or polygonal could also be used.

A handle 20 is provided on the carrier, with an upper portion 24 joined to the reinforcing ring 18 and a lower portion 22 joined to a lower portion of the side wall 12. While the handle is shown to have a somewhat modified C-shape, any handle configuration conducive to a pouring motion can be employed.

Opposed tabs 26, 28 are formed on the interior surface of the reinforcing ring and serve to hold the container within the carrier as described in more detail below.

The collapsible container 30 is unitarily formed by any suitable plastic forming process, and is preferably a low density polymer, preferably polyethylene, and includes a peripheral side all 32, a bottom wall 34 and a top wall 36. The peripheral side wall 32 is formed with a peripheral reinforcing ring or rib 38 extending about the upper end of the side wall at the juncture with the top wall 36. The top wall 36 includes an inwardly and upwardly tapered shoulder 40 which merges with a gently inclined top wall portion 42. An upstanding dispensing portion 44 is integrally formed with the top wall and extends upwardly from a generally axially centered location of the top wall. The dispensing portion 44 includes a generally cylindrical spout 46 provided with a flanged portion 48 and an exteriorly threaded portion 50 which is adapted to receive a conventional closure, such as a screw cap 52. Other closures may be utilized as well, such as conventional valve type spouts, and the like.

A textured pattern 54 may be provided over portions of the top wall 36, if desired, including the shoulder portion 40 and spout 46 for decorative purposes, as is conventional in the art.

In a preferred embodiment of the invention, a one gallon capacity container has a peripheral side wall 32 with a thickness of between about 2 and about 12 mil and preferably about 6 mil. This is contrasted with a conventional wall thickness of about 20 mil. The bottom wall 34 preferably has a thickness substantially identical to the side wall, but it may be greater if desired, as shown at 34' in FIG. 3. The top wall 36 preferably has a wall thickness similar to side wall 32, but the dispensing portion 44 must be thicker to provide the necessary degree of rigidity to support the container during filling, handling, and repeated application and removal of the screw cap 52. Thus, the dispensing portion remains of a thickness similar to conventional containers, i.e., at least about 15 to about 20 mil with the top wall gradually increasing in thickness from the peripheral side wall toward the dispensing portion as shown in FIG. 2.

Containers of the above described configuration and thicknesses will be collapsible but normally self-supporting, i.e., they will normally stand alone, empty or filled. It will be understood that the thickness dimensions provided above are applicable generally to one gallon and one-half gallon containers. Thickness dimensions may be increased for larger containers, for example, fifty-five gallon drums, but with substantially the same percent reduction in plastic required as compared to conventional containers of similar size.

Collapsible containers produced in accordance with this invention, in a conventional one gallon configuration, weigh about 30 grams, and depending on the precise wall thicknesses, slightly below. Conventional one gallon containers used in the dairy industry typically weigh between about 57 and 70 grams, the container in accordance with this invention weighing up to about 50% (or more) less than conventional containers. Similar percent reductions in weight will accrue with larger containers as well.

In use, it will be appreciated that the container 30 will nest within the carrier 10 such that the peripheral side and bottom walls 12, 14, respectively, of the carrier will provide substantially full surface support for the peripheral side and bottom walls 32, 34 of the container. In addition, and as best shown in FIG. 2, tabs 26, 28 will engage the reinforcing ring 38 just above the latter's upper edge to thereby hold the container 30 within the carrier 10 during pouring.

In an alternative use of the container 30, it is possible to handle and pour the contents from the container without the carrier 10. In other words, while the carrier has beneficial features which enhance the user's ability to pour the liquid contents from the container, the carrier is not necessarily required for the container 30 to function. Thus, user or consumer may pour the contents from container 30, although two hands may be required to provide support, i.e., one hand at the neck 44, and the other near the lower end of the side wall 32 and/or bottom wall 34. To facilitate use of the container alone, an integral, flexible gripping tab (not shown) may be integrally formed near the bottom wall 34. The flexibility of the tab would permit the latter to fold against the side wall 32 upon insertion into the carrier 10 so as not to interfere with the nested relationship of the carrier and container.

In another and preferred aspect of the invention, a method of packaging and distributing liquids includes the steps of:

a) providing a relatively rigid and reusable carrier 10 having a first peripheral side wall 12 including a handle 20, a first bottom wall 14, and an open upper end 16;

b) providing a flexible, normally self-supporting and collapsible container 30 having a second peripheral side wall 32, a second bottom wall 34 and top wall 36 formed with a dispensing portion 44 thereon;

c) filling the container 30 with a liquid and applying a removable closure 52 to the dispensing portion 44;

d) nesting the container 30 within the carrier 10 such that substantially all of the first peripheral side wall 12 and first bottom wall 14 are in engagement with, and provide support for, the second peripheral side wall 32 and the second bottom wall 34;

e) discharging the liquid from the container 30 by removing the closure 52 and tilting the carrier 10 via the handle 20 to thereby pour the liquid from the dispensing portion; and f) when the container 30 is empty, removing the empty container from the carrier 10.

Variations of the above process include the use of the container 30 alone, without the carrier, as already described.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A collapsible container and carrier assembly comprising:

a relatively rigid plastic carrier having a substantially open upper end, a first peripheral side wall and a first bottom wall defining a first shape;

a relatively thin, flexible stand-along but collapsible polymer container body having a second peripheral sidewall and a second bottom wall defining a second shape substantially complementary to said first shape; said container body also provided with a top wall, said top wall having a unitary, relatively rigid upstanding dispensing portion formed therein, said second peripheral sidewall of said container body having a thickness of between 2 and about 6 mil, said dispensing portion of said top wall having a thickness of at least about 15 mil, wherein said container body is self-supporting both filled and empty and sufficiently strong for stand-along use, and wherein said container body is nestable within said outer carrier so that substantially all of said first peripheral side wall and first bottom wall are in engagement with and provide support for said second peripheral side wall and second bottom wall, said carrier being provided with a handle on an exterior side thereof to facilitate pouring of contents from said container body.

2. The assembly according to claim 1 wherein the wall thickness of said second peripheral side and second bottom wall is about 6 mil.

3. The assembly according to claim 1 wherein said container body has a volumetric capacity of about one gallon, and a weight of between about 25 and about 35 grams.

4. The assembly according to claim 1 wherein said container body is formed with an outwardly projecting ring about at least a part of said second peripheral sidewall, and said carrier is provided with lug means on an interior side of said first peripheral side wall, said ring and said lug means cooperable to retain said container body nested within said carrier during pouring.

5. The assembly according to claim 1 wherein said second peripheral side wall, said second bottom wall and at least a portion of said top wall have substantially identical thicknesses.

6. The assembly according to claim 1 wherein said second bottom wall has a thickness at least equal to said second peripheral side wall.

7. The assembly according to claim 1 wherein said second bottom wall has a thickness greater than said second peripheral side wall.

8. The assembly according to claim 1 wherein said dispensing portion comprises a thickened upstanding neck adapted to receive a removable closure for resealing the container.

9. The assembly according to claim 8 wherein said upstanding neck has a wall thickness greater than the wall thickness of a remaining portion of said top wall.

10. The assembly according to claim 1 wherein said polymer is a low density plastic material.

11. The assembly according to claim 1 wherein said polymer is polyethylene.

12. A process for packaging and distributing liquid filled containers comprising:
 a) providing a plurality of relatively rigid and reuseable plastic carriers each having a first peripheral side wall including a handle, a first bottom wall, and an open upper end;
 b) providing a plurality of replaceable, flexible, normally self-supporting and collapsible containers each having a second peripheral side wall, a second bottom wall and top wall formed with an upstanding dispensing portion therein, the second peripheral sidewall having a thickness of between 2 and about 6 mil;
 c) filling said containers with a liquid and applying removable closures to said dispensing portions; and
 d) shipping at least some of said filled containers to retailers in a stand-alone mode without external support such that end users may utilize said containers in either a stand-along mode or in nested relationship with said carriers, said carriers being reusable with other of said replaceable containers.

13. The process according to claim 12 wherein said thickness is about 6 mil.

14. The process according to claim 12 and further comprising when said container is empty, removing said empty container from said carrier, and replacing the empty container with a substantially identical filled container.

15. The process according to claim 12 wherein said liquid is milk.

16. The process according to claim 12 wherein said liquid is water.

17. The process according to claim 12 wherein said liquid is detergent.

18. The process according to claim 12 wherein said liquid is a viscous or semi-liquid material.

19. The process according to claim 12 wherein, during the practice of step d), others of said filled containers are shipped in nested relationship with respective of said carriers.

* * * * *